United States Patent
Metreveli

(10) Patent No.: US 9,290,267 B2
(45) Date of Patent: Mar. 22, 2016

(54) VERTICAL TAKE-OFF AND LANDING AERIAL RESCUE AND FIREFIGHTING PLATFORM

(71) Applicant: David Metreveli, Everett, WA (US)

(72) Inventor: David Metreveli, Everett, WA (US)

( * ) Notice: Subject to any disclaimer, the term of this patent is extended or adjusted under 35 U.S.C. 154(b) by 346 days.

(21) Appl. No.: 14/457,362

(22) Filed: Aug. 12, 2014

(65) Prior Publication Data

US 2015/0266570 A1   Sep. 24, 2015

Related U.S. Application Data

(60) Provisional application No. 61/930,077, filed on Jan. 22, 2014.

(51) Int. Cl.
  *B64C 27/08* (2006.01)
  *B64C 27/20* (2006.01)
  *B64C 39/02* (2006.01)

(52) U.S. Cl.
  CPC ............... *B64C 27/20* (2013.01); *B64C 39/02* (2013.01)

(58) Field of Classification Search
  USPC ................ 244/17.23, 17.25, 17.11, 12.5
  See application file for complete search history.

(56) References Cited

U.S. PATENT DOCUMENTS

| | | | | |
|---|---|---|---|---|
| 6,260,796 B1 * | 7/2001 | Klingensmith | ...... | G05D 1/0858 244/17.11 |
| 8,453,962 B2 * | 6/2013 | Shaw | ...... | B64C 27/20 244/12.4 |
| 8,590,828 B2 * | 11/2013 | Marcus | ...... | B64C 29/0058 244/1 R |
| 8,695,919 B2 * | 4/2014 | Shachor | ...... | B64C 39/022 244/17.11 |
| 8,880,241 B2 * | 11/2014 | Mohamadi | ...... | B64C 19/00 244/190 |
| 2012/0152654 A1 * | 6/2012 | Marcus | ...... | A62B 5/00 182/129 |
| 2013/0068892 A1 * | 3/2013 | Bin Desa | ...... | B64C 39/024 244/190 |
| 2014/0062754 A1 * | 3/2014 | Mohamadi | ...... | F41H 11/136 342/22 |
| 2015/0181819 A1 * | 7/2015 | Celebi | ...... | B64C 39/024 701/2 |

FOREIGN PATENT DOCUMENTS

| WO | WO 2007141795 A1 * | 12/2007 | ............ B64C 39/022 |
|---|---|---|---|
| WO | WO 2014080388 A2 * | 5/2014 | ............ B64C 39/024 |

* cited by examiner

*Primary Examiner* — Christopher P Ellis

(57) ABSTRACT

A VTOL aircraft is an aerial vehicle that is utilized to reach and rescue people who are trapped in difficult-to-reach locations such as high-rise structures. The VTOL aircraft features an airframe as well as a left bidirectional thrust mechanism, and a right bidirectional thrust mechanism for providing vertical and horizontal thrust to the airframe. A plurality of engines provides torque and rotational energy that is transferred to the left bidirectional thrust mechanism and the right bidirectional thrust mechanism during operation of the VTOL aircraft. The VTOL aircraft features a housing cage on the airframe for protecting passengers, first responders, and emergency personnel onboard the aircraft. A pilot may utilize a control system located within the VTOL aircraft cockpit in order to manage the various functions of the aircraft. The VTOL aircraft features a protective enclosure for protecting the pilot from falling debris and other hazards.

20 Claims, 8 Drawing Sheets

VERTICAL TAKE-OFF AND LANDING AERIAL RESCUE AND FIREFIGHTING PLATFORM

The current application claims a priority to the U.S. Provisional Patent application Ser. No. 61/930,077 filed on Jan. 22, 2014.

FIELD OF THE INVENTION

The present invention relates generally to an aircraft for performing aerial rescue and firefighting operations, among others. More specifically, the present invention is a vertical take-off and landing (VTOL) aircraft that serves as an aerial high-rise rescue platform. The VTOL aircraft fills a number of roles in scenarios wherein traditional aircraft such as helicopters are unsuitable as well as in numerous additional applications beyond high-rise structure rescues.

BACKGROUND OF THE INVENTION

Some of the most perilous situations faced by first responders and emergency personnel such as firefighters, police officers, and emergency medical technicians (EMT) involve reaching and rescuing people who are trapped or otherwise unable to move from the upper levels of high-rise structures. Because of the difficult circumstances surrounding these scenarios, first responders and emergency personnel are often required to subject themselves to potentially life-threatening conditions in order to rescue the trapped people. The September 11 attacks on the 1 World Trade Center and 2 World Trade Center towers serve as a stark reminder of the perils faced by first responders and emergency personnel faced with the daunting task of rescuing people trapped in a high-rise location. First responders and emergency personnel on-site were unable to reach many people trapped on the upper levels of the towers following the airliner impacts and subsequent destruction of lower floors preventing their escape. In addition to people onboard the airliners and in the towers, a large number of first responders and emergency personnel perished when the towers eventually collapsed. Once the situation became clear to those trapped in the towers, many people resigned themselves to their fates and opted to leap from the towers to their deaths. This horrifying spectacle was broadcasted on live television and illustrated the need for a means of reaching and rescuing people who are trapped in high-altitude locations such as skyscrapers. As modern architecture and infrastructure continues to evolve, the likelihood of emergencies occurring in high-altitude locations increases as well. Conventional vehicles such as fire trucks and helicopters are limited in the fact that neither vehicle is designed or equipped for rescuing personnel trapped in a high-rise structure. Fire truck ladders are generally only capable of reaching approximately the lower ten levels of a high-rise structure. Helicopter rescue baskets are only capable of reaching people who are trapped on a roof and approximately five levels below the roof. Existing technologies such as these are incapable of reaching and rescuing people who are trapped within the remaining middle floors of a high-rise structure.

The present invention is a vertical take-off and landing (VTOL) aircraft that is designed to allow first responders and emergency personnel to reach and rescue people trapped in difficult-to-reach locations such as, but not limited to, high-rise structures. The present invention seeks to address the shortcomings of traditional rescue vehicles such as fire trucks and helicopters. The VTOL aircraft is capable of docking with and extracting victims from a high-rise structure by hovering in place adjacent to the structure. The VTOL aircraft is primarily intended for use as a rescue and firefighting platform with applications relating to high-rise structures and similar circumstances. However, the VTOL aircraft may fill a variety of roles in civil, military, and municipal applications, among others. The VTOL aircraft is additionally capable of transporting first responders and emergency personnel, as well as equipment. As such, the VTOL aircraft may vary in terms of configuration based on the individual needs of the applications for the VTOL aircraft.

DETAIL DESCRIPTIONS OF THE INVENTION

Figure 1:
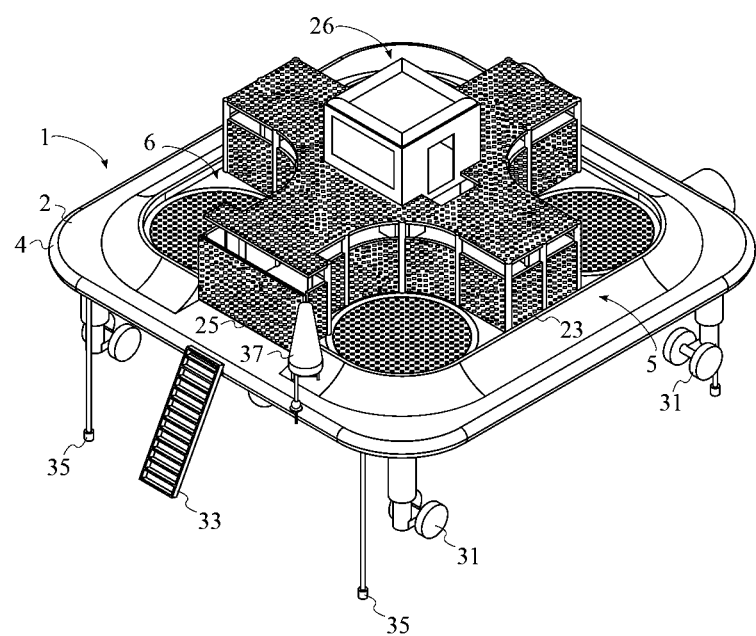
FIG. 1 is a perspective view of the VTOL aircraft.

All illustrations of the drawings are for the purpose of describing selected versions of the present invention and are not intended to limit the scope of the present invention.

The present invention is a vertical take-off and landing (VTOL) aircraft that is utilized to reach and rescue people who are trapped in difficult-to-reach locations such as, but not limited to, high-rise structures. The VTOL aircraft and individual components of the VTOL aircraft are shown in FIGS. 1-7. The VTOL aircraft comprises an airframe 1, a left bidirectional thrust mechanism 5, a right bidirectional thrust mechanism 6, a central gearbox 21, a plurality of engines 22, a housing cage 23, a cockpit 26, and a control system 30. The left bidirectional thrust mechanism 5 and the right bidirectional thrust mechanism 6 each provide the ability to maneuver the VTOL aircraft in the vertical and horizontal directions. The housing cage 23 provides an enclosure for first responders, emergency personnel, and rescued victims on the airframe 1.

Figure 2:
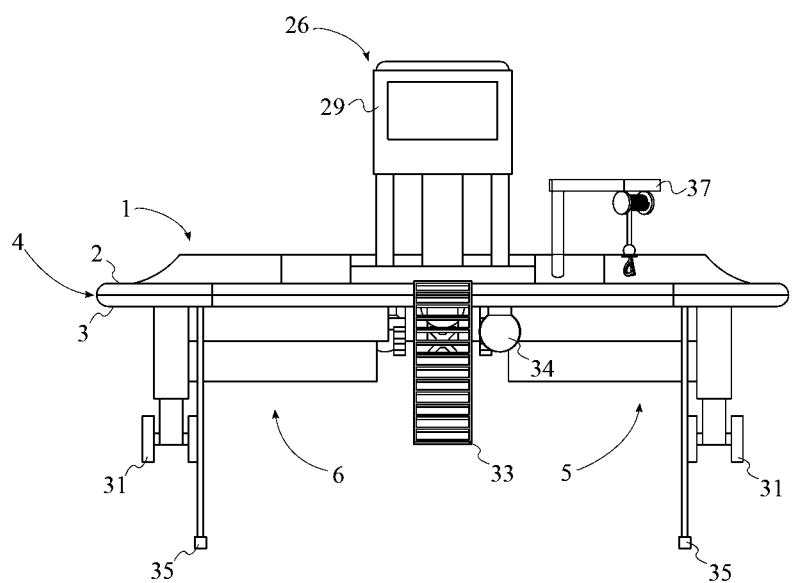
FIG. 2 is a front view of the VTOL aircraft.
Figure 3:
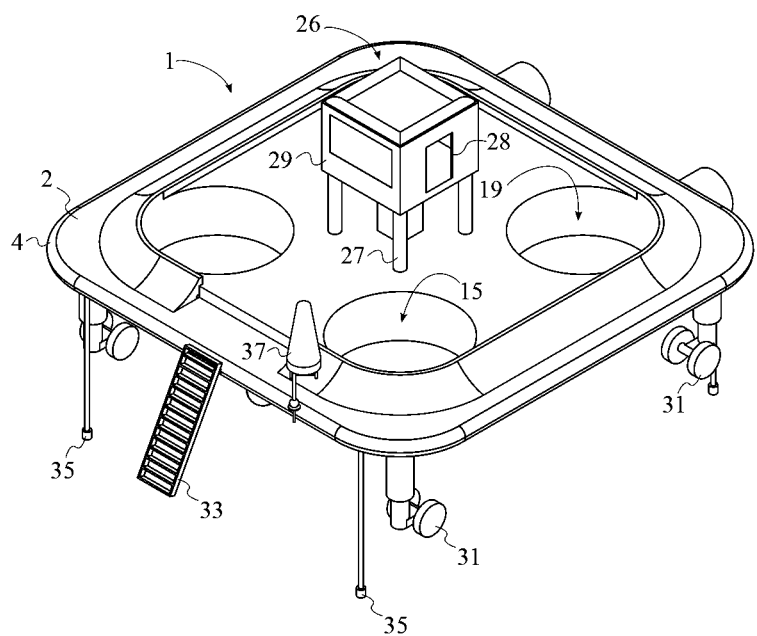
FIG. 3 is a perspective view of the VTOL aircraft without housing cage.

With reference to FIG. 1 and FIG. 2, the airframe 1 is a platform that serves as a base for personnel onboard the VTOL aircraft. In the current embodiment of the present invention, the airframe 1 is approximately square with rounded corners and comprises a first base 2, a second base 3, and a lateral portion 4. The first base 2 and second base 3 are positioned opposite of each other with the lateral portion 4 positioned between the first base 2 and the second base 3. The left bidirectional thrust mechanism 5 and the right bidirectional thrust mechanism 6 each comprise a first ducted vertical propeller 7, a second ducted vertical propeller 8, and a ducted horizontal propeller 9. The first ducted vertical propeller 7 and the second ducted vertical propeller 8 of the left bidirectional thrust mechanism 5 and the first ducted vertical propeller 7 and the second ducted vertical propeller 8 of the right bidirectional thrust mechanism 6 as a group of vertical propellers are radially positioned about the airframe 1. The plurality of engines 22 is mechanically coupled to the first ducted vertical propeller 7, the second ducted vertical propeller 8, and the ducted horizontal propeller 9 of the left bidirectional thrust mechanism 5 and the right bidirectional thrust mechanism 6 through the central gearbox 21. As such, the first ducted vertical propeller 7 and the second ducted vertical propeller 8 provide vertical thrust to the VTOL aircraft, allowing the aircraft to reach a high-altitude location and then hover in place while rescue operations are carried out. The plurality of engines 22 provides a sufficient power margin to ensure that the VTOL aircraft is able to remain in flight and land in the event of partial engine failure. The housing cage 23 is mounted onto the first base 2 and serves as an enclosure for protecting personnel on the airframe 1 from falling objects and other hazards. As shown in FIG. 3, the cockpit 26 is centrally mounted onto the first base 2 and is manned by a pilot during operation of the VTOL aircraft. The housing cage 23 is positioned between the first base 2 and the cockpit 26.

Figure 4:
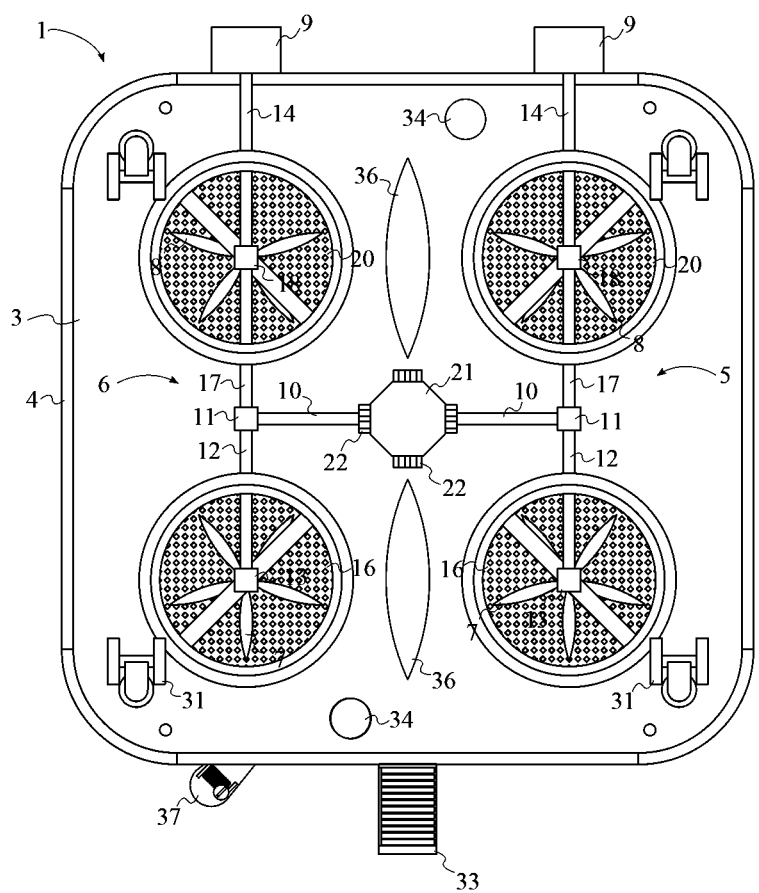
FIG. 4 is a bottom view of the VTOL aircraft.
Figure 5:
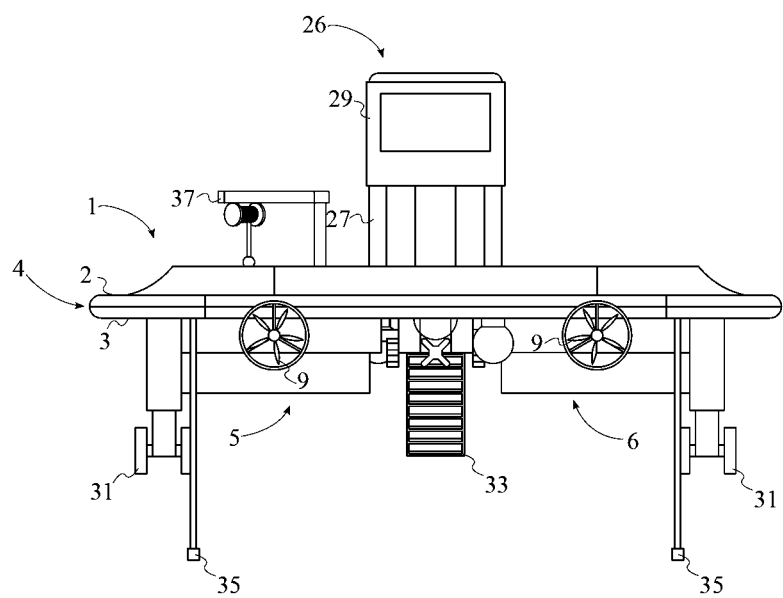
FIG. 5 is a rear view of the VTOL aircraft.

Referring to FIG. 4, the first ducted vertical propeller 7 and the second ducted vertical propeller 8 of the left bidirectional thrust mechanism 5 and the right bidirectional thrust mechanism 6 are oriented normal to the second base 3. Operation of the first ducted vertical propeller 7 and the second ducted vertical propeller 8 provides vertical thrust to the VTOL aircraft, allowing the aircraft to maneuver in the vertical plane as well as hover in place. In addition to vertical thrust, the first ducted vertical propeller 7 and the second ducted vertical propeller 8 of the left bidirectional thrust mechanism 5 and the right bidirectional thrust mechanism 6 allow the VTOL aircraft to pitch and roll as needed. This is accomplished by adjusting the thrust output of the first ducted vertical propeller 7 and the second ducted vertical propeller 8 of the left bidirectional thrust mechanism 5 and the right bidirectional thrust mechanism 6. The ducted horizontal propeller 9 of the left bidirectional thrust mechanism 5 and the ducted horizontal propeller 9 of the right bidirectional thrust mechanism 6 are mounted adjacent and normal to the lateral portion 4 as shown in FIG. 5. Additionally, the ducted horizontal propeller 9 of the left bidirectional thrust mechanism 5 and the ducted horizontal propeller 9 of the right bidirectional thrust mechanism 6 are oriented parallel to each other. The ducted horizontal propeller 9 of the left bidirectional thrust mechanism 5 and the right bidirectional thrust mechanism 6 provide horizontal thrust in order to improve maneuverability of the VTOL aircraft. Additionally, the ducted horizontal propeller 9 of the left bidirectional thrust mechanism 5 and the right bidirectional thrust mechanism 6 allow the VTOL aircraft to yaw by adjusting the thrust output of each ducted horizontal propeller 9.

The plurality of engines 22 is mechanically coupled to the first ducted vertical propeller 7, the second ducted vertical propeller 8, and the ducted horizontal propeller 9 of the left bidirectional thrust mechanism 5 and the right bidirectional thrust mechanism 6 through the central gearbox 21. The plurality of engines 22 is provided fuel by at least one fuel tank 36. The at least one fuel tank 36 is mounted to the second base 3 adjacent to the plurality of engines 22 and in between the left bidirectional thrust mechanism 5 and the right bidirectional thrust mechanism 6. The left bidirectional thrust mechanism 5 and the right bidirectional thrust mechanism 6 each comprise a primary driveshaft 10, a distribution gearbox 11, a first secondary driveshaft 12, a first output gearbox 13, a second secondary driveshaft 17, a second output gearbox 18, and a tertiary driveshaft 14. The central gearbox 21 is torsionally connected into the distribution gearbox 11 through the primary driveshaft 10. The distribution gearbox 11 is torsionally connected into the first output gearbox 13 through the first secondary driveshaft 12. The first output gearbox 13 is axially connected into the first ducted vertical propeller 7. The distribution gearbox 11 is in turn torsionally connected into the second output gearbox 18 through the second secondary driveshaft 17. The second output gearbox 18 is axially connected into the second ducted vertical propeller 8. Additionally, the second output gearbox 18 is torsionally connected into the ducted horizontal propeller 9 via the other tertiary driveshaft 14. Torque and rotational energy output by the plurality of engines 22 is transferred through the central gearbox 21 and into the other distribution gearbox 11 via the other primary driveshaft 10. The energy is then transferred from the other distribution gearbox 11 into the second secondary driveshaft 17 and the second output gearbox 18. This allows the second ducted vertical propeller 8 to rotate due to the energy transferred to the second ducted vertical propeller 8 through the axial connection with the second output gearbox 18. Energy is additionally transferred from the second output gearbox 18 to the ducted horizontal propeller 9 through the other tertiary driveshaft 14, allowing the ducted horizontal propeller 9 to rotate. During operation of the VTOL aircraft, torque and rotational energy output by the plurality of engines 22 is transferred through the central gearbox 21 into the primary driveshaft 10 and the distribution gearbox 11. The energy is transferred from the distribution gearbox 11 into the first secondary driveshaft 12 and the first output gearbox 13. The first ducted vertical propeller 7 is then able to rotate due to the energy transferred to the first ducted vertical propeller 7 via the axial connection with the first output gearbox 13. Similarly, the ducted horizontal propeller 9 is able to rotate due to the energy transferred to the ducted horizontal propeller 9 from the first output gearbox 13 through the tertiary driveshaft 14.

The left bidirectional thrust mechanism 5 and the right bidirectional thrust mechanism 6 each further comprise a first vertical opening 15 and a first mesh protective cover 16. Again referring to FIG. 3, the first vertical opening 15 traverses through the airframe 1 from the first base 2 to the second base 3 with the first ducted vertical propeller 7 concentrically mounted within the first vertical opening 15. The first mesh protective cover 16 is positioned adjacent to the first ducted vertical propeller 7 and is circumferentially mounted into the airframe 1 over the first vertical opening 15. The first mesh protective cover 16 provides a barrier against large debris that may potentially enter the first ducted vertical propeller 7 and cause catastrophic failure of the VTOL aircraft. Additionally, the first mesh protective cover 16 serves as a safety feature by eliminating the possibility of a passenger of the VTOL aircraft falling into the first ducted vertical propeller 7. The left bidirectional thrust mechanism 5 and the right bidirectional thrust mechanism 6 each further comprise a second vertical opening 19 and a second mesh protective cover 20. The second vertical opening 19 traverses through the airframe 1 from the first base 2 to the second base 3. Similar to the first ducted vertical propeller 7, the second ducted vertical propeller 8 is concentrically mounted within the second vertical opening 19. The second mesh protective cover 20 is positioned adjacent to the second ducted vertical propeller 8 and is circumferentially mounted into the airframe 1 over the second vertical opening 19. As with the first mesh protective cover 16, the second mesh protective cover 20 provides a barrier between the exterior environment and the second ducted vertical propeller 8.

The VTOL aircraft is capable of taking off from and landing onto a surface. In the current embodiment of the present invention, the VTOL aircraft further comprises a plurality of landing wheel fixtures 31. The plurality of landing wheel fixtures 31 is perimetrically mounted about the second base 3 and is utilized when landing the VTOL aircraft onto a surface as well as when maneuvering the aircraft on the surface. In the current embodiment of the present invention, the plurality of landing wheel fixtures 31 is mounted adjacent to the corners of the airframe 1.

Figure 7:
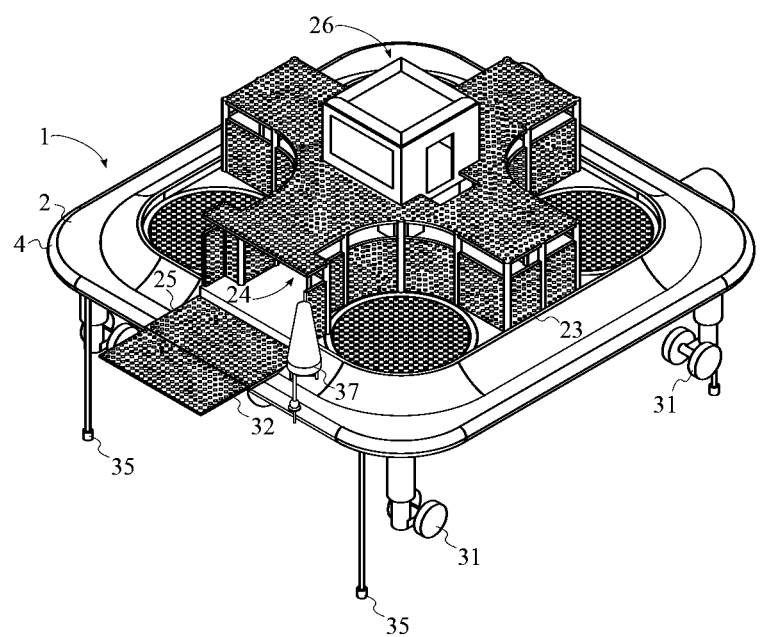
FIG. 7 is a perspective view of the VTOL aircraft with extendable walkway extended.
Figure 8:
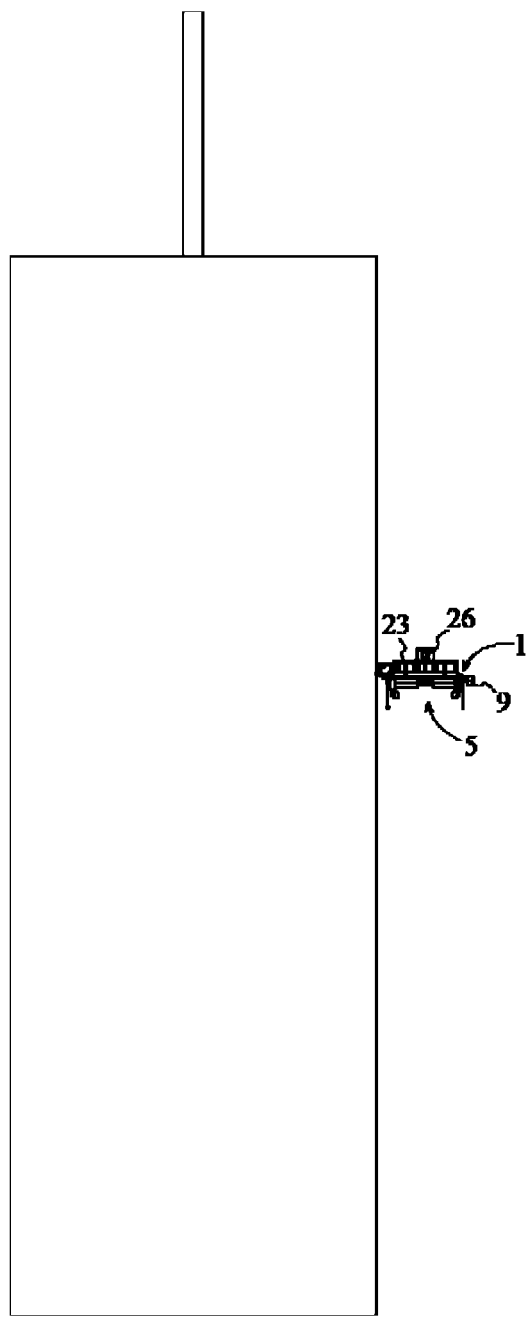
FIG. 8 is a diagrammatic overview of the primary intended application of the VTOL aircraft in an aerial high-rise rescue or firefighting application.

The housing cage 23 comprises a cage opening 24 and a gate 25. The housing cage 23 provides an enclosure that protects passengers from falling debris and other hazards while simultaneously ensuring that the passengers do not fall off of the VTOL aircraft. The housing cage 23 is positioned in between the first ducted vertical propeller 7 and the second ducted vertical propeller 8 for both the left bidirectional thrust mechanism 5 and the right bidirectional thrust mechanism 6. This ensures that the housing cage 23 does not impede airflow through the first ducted vertical propeller 7 and the second ducted vertical propeller 8 of both the left bidirectional thrust mechanism 5 and the right bidirectional thrust mechanism 6. The cage opening 24 is positioned in between the first ducted vertical propeller 7 of the left bidirectional thrust mechanism 5 and the first ducted vertical propeller 7 of the right bidirectional thrust mechanism 6. The cage opening 24 is utilized as the entrance and exit for passengers entering and exiting the housing cage 23. The gate 25 is hingedly mounted to the first base 2 and positioned adjacent to the cage opening 24. This allows the gate 25 to be closed and opened in order to cover and uncover the cage opening 24, respectively. The gate 25 may serve as a crowd control measure as well in order to prevent panicked victims from rushing onto and overburdening the VTOL aircraft in an emergency situation. The housing cage 23 may further comprise cage lights for illumination as well as a cage camera for providing a video feed of the cage opening 24. Referring to FIG. 7, the VTOL aircraft further comprises an extendable walkway 32 that is positioned adjacent to the cage opening 24. The extendable walkway 32 is laterally mounted to the airframe 1 and is utilized to provide a stable surface for passengers entering the VTOL aircraft when the aircraft has docked with a building and is in the process of extracting victims as shown in FIG. 8. The VTOL aircraft further comprises a ladder 33 that is positioned adjacent to the cage opening 24 of the housing cage 23. The ladder 33 is utilized by passengers and other personnel when boarding and departing from the VTOL aircraft. The ladder 33 is laterally and hingedly mounted to the airframe 1. This allows the ladder 33 to be deployed and retracted as necessary.

Figure 6:
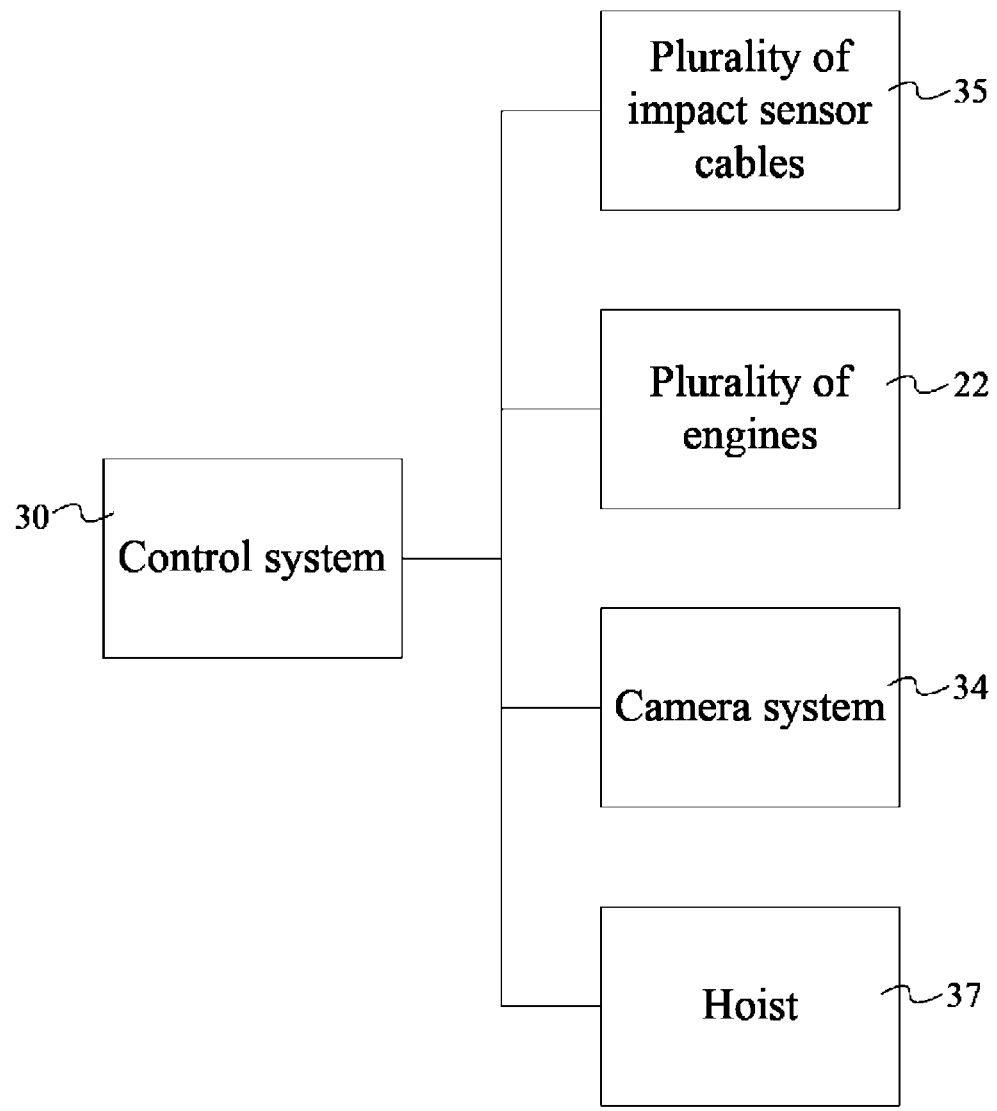
FIG. 6 is a diagrammatic overview of the VTOL aircraft control system.

The control system 30 is utilized by a pilot of the VTOL aircraft to operate the various functions of the aircraft. As shown in FIG. 6, the control system 30 is electronically connected to the plurality of engines 22, allowing the pilot to manage the torque and rotational energy output of the plurality of engines 22. The cockpit 26 of the VTOL aircraft comprises a foundation 27, an access hatch 28, and a protective enclosure 29. The protective enclosure 29 is centrally mounted on the first base 2 by the foundation 27. The protective enclosure 29 protects the pilot from falling debris and other hazards while operating the VTOL aircraft. The access hatch 28 traverses from the housing cage 23 into the protective enclosure 29 and is utilized by the pilot to enter the cockpit 26. The control system 30 is positioned within the protective enclosure 29.

In the current embodiment of the present invention, the VTOL aircraft further comprises a camera system 34 that is pivotally mounted to the second base 3 and positioned adjacent to the lateral portion 4. The camera system 34 is electronically connected to the control system 30 and is designed to improve safety of the VTOL aircraft. The camera system 34 provides a video feed to the pilot of the second base 3 in order to facilitate actions such as landing the VTOL aircraft. The VTOL aircraft further comprises a plurality of impact sensor cables 35 that are perimetrically mounted about the second base 3, similar to the plurality of landing wheel fixtures 31. The plurality of impact sensor cables 35 is electronically connected to the control system 30 as well and is utilized to provide the pilot with an indicator of the VTOL aircraft's altitude during various actions such as landing. In the current embodiment of the present invention, the plurality of impact sensor cables 35 are designed to come into contact with a surface such as the ground prior to the remainder of the VTOL aircraft coming into contact with the ground. As such, the plurality of impact sensor cables 35 is able to relay information regarding the imminence of impact with the ground to the pilot through the control system 30.

The present invention is primarily designed and intended for use in aerial high-rise rescue and firefighting scenarios. The present invention addresses the need for a means of rescuing people who are trapped and cannot be reached by conventional technologies such as fire truck ladders and helicopters. However, the present invention may be utilized for various additional applications in the civil, military, and municipal fields, among others. For example, the present invention may be utilized in additional applications including, but not limited to, power line construction and maintenance, high-rise window cleaning, construction, equipment and material transport, personal aerial transportation, anti-terrorist operations, military payload and troop transportation, water rescue operations, and mountain rescue operations. The configuration of the VTOL aircraft may vary based on the needs of the individual applications as well. For example, when utilized in water rescue operations, the VTOL aircraft may further comprise a plurality of flotation devices that are perimetrically mounted about the second base 3 in order to provide buoyancy to the VTOL aircraft on the surface of a body of water. The VTOL aircraft may additionally comprise a rescue hoist 37 for use in rescuing victims from water, similar to a helicopter rescue basket. The hoist 37 is swivelably mounted to the first base 2 and is electronically connected to the control system 30. In military applications of the present invention, the VTOL aircraft may further comprise armor plating placed over the housing cage 23 and airframe 1 of the aircraft. The interior of the housing cage 23 may be outfitted according to the needs of the individual applications as well in order to include features such as, but not limited to, seats, stretchers, and other equipment and accessories.

Although the invention has been explained in relation to its current embodiment, it is to be understood that many other possible modifications and variations can be made without departing from the spirit and scope of the invention as hereinafter claimed.

What is claimed is:

1. A vertical take-off and landing (VTOL) aircraft comprises:
   an airframe;
   a left bidirectional thrust mechanism;
   a right bidirectional thrust mechanism;
   a central gearbox;
   a plurality of engines;
   a housing cage;
   a cockpit;
   a control system;
   the airframe comprises a first base, a second base, and a lateral portion;
   the left bidirectional thrust mechanism and the right bidirectional thrust mechanism each comprise a first ducted vertical propeller, a second ducted vertical propeller, and a ducted horizontal propeller;

the first ducted vertical propeller and the second ducted vertical propeller of the left bidirectional thrust mechanism and the first ducted vertical propeller and the second ducted vertical propeller of the right bidirectional thrust mechanism being radially positioned about the airframe;

the plurality of engines being mechanically coupled to the first ducted vertical propeller, the second ducted vertical propeller, and the ducted horizontal propeller of the left bidirectional thrust mechanism through the central gearbox;

the plurality of engines being mechanically coupled to the first ducted vertical propeller, the second ducted vertical propeller, and the ducted horizontal propeller of the right bidirectional thrust mechanism through the central gearbox;

the housing cage being mounted onto the first base;

the cockpit being centrally mounted onto the first base; and the housing cage being positioned in between the first base and the cockpit.

2. The VTOL aircraft as claimed in claim 1 comprises:

the first ducted vertical propeller and the second ducted vertical propeller of the left bidirectional thrust mechanism being oriented normal to the second base; and the first ducted vertical propeller and the second ducted vertical propeller of the right bidirectional thrust mechanism being oriented normal to the second base.

3. The VTOL aircraft as claimed in claim 1 comprises:

the ducted horizontal propeller of the left bidirectional thrust mechanism and the ducted horizontal propeller of the right bidirectional thrust mechanism being mounted adjacent and normal to the lateral portion; and the ducted horizontal propeller of the left bidirectional thrust mechanism and the ducted horizontal propeller of the right bidirectional thrust mechanism being oriented parallel to each other.

4. The VTOL aircraft as claimed in claim 1 comprises:

the left bidirectional thrust mechanism and the right bidirectional thrust mechanism each further comprise a primary driveshaft, a distribution gearbox, a first secondary driveshaft, and a first output gearbox;

the central gearbox being torsionally connected into the distribution gearbox through the primary driveshaft;

the distribution gearbox being torsionally connected into the first output gearbox through the first secondary driveshaft; and the first output gearbox being axially connected into the first ducted vertical propeller.

5. The VTOL aircraft as claimed in claim 4 comprises:

the left bidirectional thrust mechanism and the right bidirectional thrust mechanism each further comprise a first vertical opening and a first mesh protective cover;

the first vertical opening traversing through the airframe from the first base to the second base;

the first ducted vertical propeller being concentrically mounted within the first vertical opening;

the first mesh protective cover being positioned adjacent to the first ducted vertical propeller; and the first mesh protective cover being circumferentially mounted into the airframe over the first vertical opening.

6. The VTOL aircraft as claimed in claim 1 comprises:

the left bidirectional thrust mechanism and the right bidirectional thrust mechanism each further comprise a primary driveshaft, a distribution gearbox, a second secondary driveshaft, a second output gearbox, and a tertiary driveshaft;

the central gearbox being torsionally connected into the distribution gearbox through the primary driveshaft;

the distribution gearbox being torsionally connected into the second output gearbox through the second secondary driveshaft;

the second output gearbox being axially connected into the second ducted vertical propeller; and the second output gearbox being torsionally connected into the ducted horizontal propeller through the tertiary driveshaft.

7. The VTOL aircraft as claimed in claim 6 comprises:

the left bidirectional thrust mechanism and the right bidirectional thrust mechanism each further comprise a second vertical opening and a second mesh protective cover;

the second vertical opening traversing through the airframe from the first base to the second base;

the second ducted vertical propeller being concentrically mounted within the second vertical opening;

the second mesh protective cover being positioned adjacent to the second ducted vertical propeller; and the second mesh protective cover being circumferentially mounted into the airframe over the second vertical opening.

8. The VTOL aircraft as claimed in claim 1 further comprises:

a plurality of landing wheel fixtures; and the plurality of landing wheel fixtures being perimetrically mounted about the second base.

9. The VTOL aircraft as claimed in claim 1 further comprises:

the housing cage comprises a cage opening and a gate;

the housing cage being positioned in between the first ducted vertical propeller and the second ducted vertical propeller for both the left bidirectional thrust mechanism and the right bidirectional thrust mechanism;

the cage opening being positioned in between the first ducted vertical propeller of the left bidirectional thrust mechanism and the first ducted vertical propeller of the right bidirectional thrust mechanism;

the gate being hingedly mounted to the first base; and the gate being positioned adjacent to the cage opening, wherein the gate is used to selectively cover the cage opening.

10. The VTOL aircraft as claimed in claim 1 further comprises:

an extendable walkway;

the extendable walkway being positioned adjacent to a cage opening of the housing cage; and the extendable walkway being laterally mounted to the airframe.

11. The VTOL aircraft as claimed in claim 1 further comprises:

a ladder;

the ladder being positioned adjacent to a cage opening of the housing cage; and the ladder being laterally and hingedly mounted to the airframe.

12. The VTOL aircraft as claimed in claim 1 further comprises:

the control system being electronically connected to the plurality of engines.

13. The VTOL aircraft as claimed in claim 1 further comprises:

the cockpit comprises a foundation, an access hatch, and a protective enclosure;

the protective enclosure being centrally mounted on the first base by the foundation;

the access hatch traversing from the housing cage into the protective enclosure; and the control system being positioned within the protective enclosure.

14. The VTOL aircraft as claimed in claim 1 further comprises:

a camera system;

the camera system being pivotally mounted to the second base;

the camera system being positioned adjacent to the lateral portion; and the camera system being electronically connected to the control system.

15. The VTOL aircraft as claimed in claim 1 further comprises:

a plurality of impact sensor cables;

the plurality of impact sensor cables being perimetrically mounted about the second base; and the plurality of impact sensor cables being electronically connected to the control system.

16. The VTOL aircraft as claimed in claim 1 further comprises:

a hoist;

the hoist being swivelably mounted on the first base; and the hoist being electronically connected to the control system.

17. A VTOL aircraft comprises:

an airframe;

a left bidirectional thrust mechanism;

a right bidirectional thrust mechanism;

a central gearbox;

a plurality of engines;

a housing cage;

a cockpit;

a control system;

a plurality of landing wheel fixtures;

an extendable walkway;

a ladder;

a camera system;

a plurality of impact sensor cables;

a hoist;

the airframe comprises a first base, a second base, and a lateral portion;

the left bidirectional thrust mechanism and the right bidirectional thrust mechanism each comprise a first ducted vertical propeller, a second ducted vertical propeller, and a ducted horizontal propeller;

the first ducted vertical propeller and the second ducted vertical propeller of the left bidirectional thrust mechanism and the first ducted vertical propeller and the second ducted vertical propeller of the right bidirectional thrust mechanism being radially positioned about the airframe;

the plurality of engines being mechanically coupled to the first ducted vertical propeller, the second ducted vertical propeller, and the ducted horizontal propeller of the left bidirectional thrust mechanism through the central gearbox;

the plurality of engines being mechanically coupled to the first ducted vertical propeller, the second ducted vertical propeller, and the ducted horizontal propeller of the right bidirectional thrust mechanism through the central gearbox;

the housing cage comprises a cage opening and a gate;

the housing cage being mounted onto the first base;

the cockpit comprises a foundation, an access hatch, and a protective enclosure;

the cockpit being centrally mounted onto the first base;

the protective enclosure being centrally mounted on the first base by the foundation;

the access hatch traversing from the housing cage into the protective enclosure;

the control system being positioned within the protective enclosure;

the control system being electronically connected to the plurality of engines;

the housing cage being positioned in between the first base and the cockpit;

the plurality of landing wheel fixtures being perimetrically mounted about the second base;

the extendable walkway being positioned adjacent to the cage opening;

the extendable walkway being laterally mounted to the airframe;

the ladder being positioned adjacent to the cage opening;

the ladder being laterally and hingedly mounted to the airframe;

the camera system being pivotally mounted to the second base;

the camera system being positioned adjacent to the lateral portion;

the camera system being electronically connected to the control system;

the plurality of impact sensor cables being perimetrically mounted about the second base; and the plurality of impact sensor cables being electronically connected to the control system;

the hoist being swivelably mounted on the first base;

the hoist being electronically connected to the control system.

18. The VTOL aircraft as claimed in claim 17 further comprises:

the first ducted vertical propeller and the second ducted vertical propeller of the left bidirectional thrust mechanism being oriented normal to the second base;

the first ducted vertical propeller and the second ducted vertical propeller of the right bidirectional thrust mechanism being oriented normal to the second base;

the ducted horizontal propeller of the left bidirectional thrust mechanism and the ducted horizontal propeller of the right bidirectional thrust mechanism being mounted adjacent and normal to the lateral portion; and the ducted horizontal propeller of the left bidirectional thrust mechanism and the ducted horizontal propeller of the right bidirectional thrust mechanism being oriented parallel to each other.

19. The VTOL aircraft as claimed in claim 17 further comprises:

the left bidirectional thrust mechanism and the right bidirectional thrust mechanism each further comprise a primary driveshaft, a distribution gearbox, a first secondary driveshaft, a first output gearbox, a tertiary driveshaft, a first vertical opening, a first mesh protective cover, a second secondary driveshaft, a second output gearbox, a second vertical opening, and a second mesh protective cover;

the central gearbox being torsionally connected into the distribution gearbox through the primary driveshaft;

the distribution gearbox being torsionally connected into the first output gearbox through the first secondary driveshaft;

the first output gearbox being axially connected into the first ducted vertical propeller;

the first vertical opening traversing through the airframe from the first base to the second base;

the first ducted vertical propeller being concentrically mounted within the first vertical opening;

the first mesh protective cover being positioned adjacent to the first ducted vertical propeller;

the first mesh protective cover being circumferentially mounted into the airframe over the first vertical opening;

the central gearbox being torsionally connected into the distribution gearbox through the primary driveshaft;

the distribution gearbox being torsionally connected into the second output gearbox through the second secondary driveshaft;

the second output gearbox being axially connected into the second ducted vertical propeller;

the second output gearbox being torsionally connected into the ducted horizontal propeller through the tertiary driveshaft;

the second vertical opening traversing through the airframe from the first base to the second base;

the second ducted vertical propeller being concentrically mounted within the second vertical opening;

the second mesh protective cover being positioned adjacent to the second ducted vertical propeller; and the second mesh protective cover being circumferentially mounted into the airframe over the second vertical opening.

20. The VTOL aircraft as claimed in claim 17 further comprises:

the housing cage being positioned in between the first ducted vertical propeller and the second ducted vertical propeller for both the left bidirectional thrust mechanism and the right bidirectional thrust mechanism;

the cage opening being positioned in between the first ducted vertical propeller of the left bidirectional thrust mechanism and the first ducted vertical propeller of the right bidirectional thrust mechanism;

the gate being hingedly mounted to the first base; and the gate being positioned adjacent to the cage opening, wherein the gate is used to selectively cover the cage opening.

* * * * *